US012811716B2

(12) United States Patent
Venkataraghavan

(10) Patent No.: US 12,811,716 B2
(45) Date of Patent: Nov. 24, 2026

(54) SYSTEM, METHOD, AND COMPUTER PROGRAM FOR MANAGING CONTROL CHANNEL CODING RATE

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 606 days.

(21) Appl. No.: 18/005,219

(22) PCT Filed: Nov. 30, 2022

(86) PCT No.: PCT/US2022/051381
§ 371 (c)(1),
(2) Date: Jan. 12, 2023

(87) PCT Pub. No.: WO2024/118069
PCT Pub. Date: Jun. 6, 2024

(65) Prior Publication Data
US 2024/0243837 A1 Jul. 18, 2024

(51) Int. Cl.
*H04L 1/00* (2006.01)
*H04L 41/16* (2022.01)

(52) U.S. Cl.
CPC ............ *H04L 1/0009* (2013.01); *H04L 41/16* (2013.01)

(58) Field of Classification Search
CPC . H04B 17/3913; H04B 17/345; H04L 1/0009; H04L 1/16; H04L 41/16; H04W 28/02; H04W 24/02; G06N 20/00
See application file for complete search history.

(56) References Cited

U.S. PATENT DOCUMENTS

| | | | | |
|---|---|---|---|---|
| 2009/0274204 | A1* | 11/2009 | Chen .................. | H04L 27/2601 375/228 |
| 2012/0026985 | A1* | 2/2012 | Ren ....................... | H04L 1/1692 370/336 |
| 2016/0150524 | A1 | 5/2016 | Ramkumar et al. | |
| 2021/0185651 | A1* | 6/2021 | Seo ....................... | H04W 24/08 |
| 2022/0109622 | A1 | 4/2022 | Yeh et al. | |

(Continued)

OTHER PUBLICATIONS

International Search Report dated Apr. 13, 2023 in application No. PCT/US22/51381.

(Continued)

*Primary Examiner* — Noel R Beharry
*Assistant Examiner* — Rodrick Mak
(74) *Attorney, Agent, or Firm* — Sughrue Mion, PLLC

(57) ABSTRACT

Provided are apparatus, method, and device for managing control channel coding rate. The apparatus including: a memory storage storing computer-executable instructions; and at least one processor communicatively coupled to the memory storage, wherein the at least one processor is configured to execute the instructions to: obtain data relating to a current coding rate of a control channel and network data relating to a current control channel quality; analyze, by a machine learning (ML) model, the obtained data and the obtained network data to determine an optimal coding rate for the control channel; and output the determined optimal coding rate.

20 Claims, 13 Drawing Sheets

(56) References Cited

U.S. PATENT DOCUMENTS

| | | | | |
|---|---|---|---|---|
| 2023/0198702 | A1* | 6/2023 | Kim | H04L 27/2601 370/329 |
| 2023/0361839 | A1* | 11/2023 | Mu | H04L 5/0057 |
| 2024/0063938 | A1* | 2/2024 | Jovanovic | H04L 1/0009 |
| 2024/0244609 | A1* | 7/2024 | Raghavan | H04W 72/12 |

OTHER PUBLICATIONS

Written Opinion of the International Searching Authority dated Apr. 13, 2023 in application No. PCT/US22/51381.

* cited by examiner

Poor channel quality → Good channel quality

Low coding rate, high resources → High coding rate, low resources

| No. | SINR Range (dBm) | Coding Rate |
|---|---|---|
| 1 | -25 ≤ SINR ≤ -20 | c1 |
| 2 | -20 ≤ SINR ≤ -15 | c2 |
| 3 | -15 ≤ SINR ≤ -10 | c3 |
| 4 | -10 ≤ SINR ≤ -5 | c4 |
| 5 | -5 ≤ SINR < 0 | c5 |
| 6 | 0 ≤ SINR ≤ 5 | c6 |
| 7 | 5 ≤ SINR ≤ 10 | c7 |
| 8 | 10 ≤ SINR ≤ 15 | c8 |
| 9 | 15 ≤ SINR ≤ 20 | c9 |
| 10 | 20 ≤ SINR ≤ 25 | c10 |
| 11 | 25 ≤ SINR ≤ 30 | c11 |

FIG.1A (Related Art)

511

| No. | SINR Range (dBm) | Coding Rate |
|---|---|---|
| ⋮ | ⋮ | ⋮ |
| 4 | -10 ≤ SINR ≤ -5 | c4 |
| 5 | -5 ≤ SINR < 0 | c5 |
| ⋮ | ⋮ | ⋮ |

512

| No. | SINR Range (dBm) | Coding Rate |
|---|---|---|
| ⋮ | ⋮ | ⋮ |
| 4 | -10 ≤ SINR ≤ -5 | co4 |
| 5 | -5 ≤ SINR < 0 | c4 |
| ⋮ | ⋮ | ⋮ |

FIG. 5B

611

| No. | SINR Range (dBm) | Coding Rate |
|---|---|---|
| ⋯ | ⋯ | ⋯ |
| 4 | -10 ≤ SINR ≤ -5 | c4 |
| 5 | -5 ≤ SINR < 0 | c5 |
| ⋯ | ⋯ | ⋯ |

612

| No. | SINR Range (dBm) | Coding Rate |
|---|---|---|
| ⋯ | ⋯ | ⋯ |
| 4 | -10 ≤ SINR ≤ -5 | c5 |
| 5 | -5 ≤ SINR < 0 | co4 |
| ⋯ | ⋯ | ⋯ |

FIG. 6B

711

| RNTI Type | CRC Fails (%) |
|---|---|
| C-RNTI | A % |
| P-RNTI | B % |
| RA-RNTI | C % |
| SI-RNTI | D % |
| Temp C-RNTI | E % |

712

| RNTI Type | Coding Rate | Network Resource 1 |
|---|---|---|
| C RNTI | C1_a | a |
| P RNTI | C1_b | b |
| RA RNTI | C1_c | c |
| SI RNTI | C1_d | d |
| Temp C-RNTI | C1_e | e |

FIG. 7

811

| Channel Type | CRC Fails (%) |
|---|---|
| RACH | A % |
| PUCCH | B % |
| PDCCH | C % |
| PUSCH | D % |
| BCCH | E % |

812

| Channel Type | Coding Rate | Network Resource 1 |
|---|---|---|
| RACH | C1_a | a |
| PUCCH | C1_b | b |
| PDCCH | C1_c | c |
| PUSCH | C1_d | d |
| BCCH | C1_e | e |

FIG. 8

SYSTEM, METHOD, AND COMPUTER PROGRAM FOR MANAGING CONTROL CHANNEL CODING RATE

CROSS REFERENCE TO RELATED APPLICATIONS

This application is a National Stage of International Application No. PCT/US2022/051381 filed Nov. 30, 2022.

TECHNICAL FIELD

Apparatuses and methods consistent with example embodiments of the present disclosure relate to the field of network systems, and more particularly, relate to managing coding rates of control channels in network systems.

BACKGROUND

In the related art, the coding rates of control channels are predetermined and are static. The static nature of coding rates, which are associated with the robustness of control channels and efficiency of network resources utilization, are not suitable for serving dynamic channel performance and frequently changing network resources requirements.

Further, in the related art, it is challenging to continuously maintain an optimal coding rate to achieve a balance between control channel robustness and the network resource efficiency.

Furthermore, in the related art, a user (e.g., a vendor, etc.) may need to manually reconfigure the coding rates when required, and such an approach is not efficient and is not effective when the coding rates are required to be frequently reconfigured.

SUMMARY

Example embodiments of the present disclosure provide an apparatus and method for efficiently and effectively determining an optimal coding rate which accommodates a network system that has varying coding rate requirement. Further, example embodiments of the present disclosure utilize a machine learning (ML) model to continuously or periodically determine an optimal coding rate for a control channel based on current network data. Furthermore, example embodiments of the present disclosure automatically adjust a coding rates of a control channel without requiring manual intervention from the user.

According to embodiments, an apparatus includes: a memory storage storing computer-executable instructions; and at least one processor communicatively coupled to the memory storage, wherein the at least one processor is configured to execute the instructions to: obtain data relating to a current coding rate of a control channel and network data relating to a current control channel quality; analyze, by a machine learning (ML) model, the obtained data and the obtained network data to determine an optimal coding rate for the control channel; and output the determined optimal coding rate.

The at least one processor may be configured to execute the instructions to repeatedly perform the obtaining, the analyzing, and the outputting.

The at least one processor may be configured to execute the instructions to analyze the obtained data and the obtained network data to determine the optimal coding rate by using a supervised ML model.

The data relating to the current coding rate of the control channel may include a mapping of the current coding rate to a current signal to interference and noise ratio (SINR) range.

The network data may include a percentage of negative acknowledgement (NACK).

The at least one processor may be configured to execute the instructions to analyze the obtained data and the obtained network data to determine the optimal coding rate by: determining, based on the obtained network data, whether or not the current control channel quality is within an allowable condition; based on determining that the current control channel quality is not within the allowable condition, reconfiguring the current coding rate of the mapping to a coding rate of a SINR range lower than the current SINR range; and determining the reconfigured coding rate as the optimal coding rate.

The at least one processor may be configured to execute the instructions to analyze the obtained data and the obtained network data to determine the optimal coding rate by: based on determining that the current control channel quality is within the allowable condition, reconfiguring the current coding rate of the mapping to a coding rate of a SINR range higher than the current SINR range; and determining the reconfigured coding rate as the optimal coding rate.

According to embodiments, a method, performed by at least one processor, includes: obtaining data relating to a current coding rate of a control channel and network data relating to a current control channel quality; analyzing, by a machine learning (ML) model, the obtained data and the obtained network data to determine an optimal coding rate for the control channel; and outputting the determined optimal coding rate.

The method may further include repeating the obtaining, the analyzing, and the outputting.

The analyzing of the obtained data and the obtained network data to determine the optimal coding rate may include using a supervised ML model to analyze the obtained data and the obtained network data.

The data relating to the current coding rate of the control channel may include a mapping of the current coding rate to a current signal to interference and noise ratio (SINR) range.

The network data may include a percentage of negative acknowledgement (NACK).

The analyzing of the obtained data and the obtained network data to determine the optimal coding rate may include: determining, based on the obtained network data, whether or not the current control channel quality is within an allowable condition; based on determining that the current control channel quality is not within the allowable condition, reconfiguring the current coding rate of the mapping to a coding rate of a SINR range lower than the current SINR range; and determining the reconfigured coding rate as the optimal coding rate.

The analyzing of the obtained data and the obtained network data to determine the optimal coding rate may include: based on determining that the current control channel quality is within the allowable condition, reconfiguring the current coding rate of the mapping to a coding rate of a SINR range higher than the current SINR range; and determining the reconfigured coding rate as the optimal coding rate.

According to embodiments, a non-transitory computer-readable recording medium having recorded thereon instructions executable by at least one processor to cause the at least one processor to perform a method including: obtaining data relating to a current coding rate of a control channel and network data relating to a current control channel quality;

analyzing, by a machine learning (ML) model, the obtained data and the obtained network data to determine an optimal coding rate for the control channel; and outputting the determined optimal coding rate.

The non-transitory computer-readable recording medium may have recorded thereon instructions executable by at least one processor to cause the at least one processor to perform the method, which may further include repeating the obtaining, the analyzing, and the outputting.

The non-transitory computer-readable recording medium may have recorded thereon instructions executable by at least one processor to cause the at least one processor to perform the method, in which the analyzing of the obtained data and the obtained network data to determine the optimal coding rate may include using a supervised ML model to analyze the obtained data and the obtained network data.

The non-transitory computer-readable recording medium may have recorded thereon instructions executable by at least one processor to cause the at least one processor to perform the method, in which the data relating to the current coding rate of the control channel may include a mapping of the current coding rate to a current signal to interference and noise ratio (SINR) range.

The non-transitory computer-readable recording medium may have recorded thereon instructions executable by at least one processor to cause the at least one processor to perform the method, in which the network data may include a percentage of negative acknowledgement (NACK).

The non-transitory computer-readable recording medium may have recorded thereon instructions executable by at least one processor to cause the at least one processor to perform the method, in which the analyzing of the obtained data and the obtained network data to determine the optimal coding rate may include: determining, based on the obtained network data, whether or not the current control channel quality is within an allowable condition; based on determining that the current control channel quality is not within the allowable condition, reconfiguring the current coding rate of the mapping to a coding rate of a SINR range lower than the current SINR range; and determining the reconfigured coding rate as the optimal coding rate.

The non-transitory computer-readable recording medium may have recorded thereon instructions executable by at least one processor to cause the at least one processor to perform the method, in which the analyzing of the obtained data and the obtained network data to determine the optimal coding rate may include: based on determining that the current control channel quality is within the allowable condition, reconfiguring the current coding rate of the mapping to a coding rate of a SINR range higher than the current SINR range; and determining the reconfigured coding rate as the optimal coding rate.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein:

FIG. 1A illustrates a table containing examples of coding rate to signal to interference and noise ratio (SINR) mapping in the related art;

FIG. 5B illustrates an example embodiment in which the coding rate to SINR mapping is reconfigured in a similar manner as described with reference to operation of FIG. 5A;

FIG. 6B illustrates an example embodiment in which the coding rate to SINR mapping is reconfigured in a similar manner as described with reference to operation of FIG. 6A;

FIG. 7 illustrates radio network temporary identifiers (RNTI) information of a control channel, according to one or more embodiments;

FIG. 8 illustrates multiple control channels and the associated information, according to one or more embodiments;

DETAILED DESCRIPTION

Figure 1B:
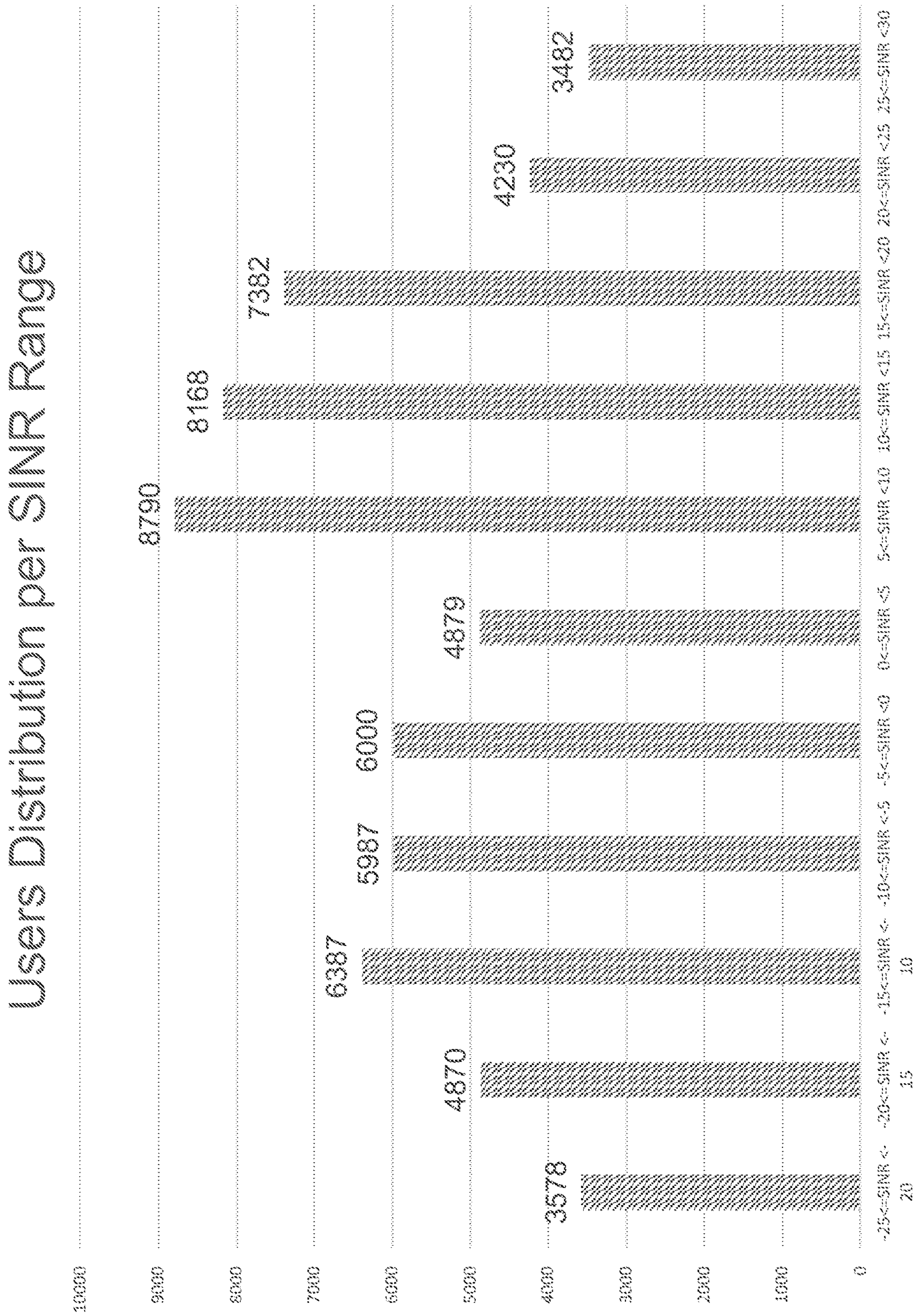
FIG.1B (Related Art)
FIG. 1B illustrates an example of users distribution as per SINR range obtained from a practical network system in the related art.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

In telecommunication network systems, control channels are utilized for transferring control plane information that define network configuration (e.g., how data packets should be forwarded in a telecommunication network, etc.). By way of example, random access control channel (RACH) is utilized to carry control information for configuring initial random access, physical uplink control channel (PUCCH) is utilized to carry uplink control information (UCI), physical downlink control channel (PDCCH) is utilized to carry downlink control information (DCI), and the like. Thus, ensuring the robustness of control channels is always one of the most important aspects in telecommunication network system, in order to provide a stable network performance thereto.

The robustness of a control channel may be defined by, amongst others, the associated coding rate (e.g., per radio network temporary identifier (RNTI), etc.). In this regard, a coding rate is the ratio of allocated data rate and the maximum data rate that can ideally be allocated. Simply put, the coding rate of a control channel represents the number of useful information which can be transmitted in the control channel as compared to the payload supported by the control channel.

To this end, the coding rate of the control channel is correlated to the allocation of network resources (e.g., frequency domain resources such as physical resource block (PRB), etc.). For instance, more redundancy resources may be allocated for channel coding process under a lower coding rate and less redundancy resources may be allocated for channel coding process under a higher coding rate. Simply put, the lower the coding rate, the higher the robustness of the control channel, at a cost of reduced network resource efficiency since higher amount of resources are allocated for transmitting the same amount of information.

In the related art, a vendor of a network element (e.g., a radio component, etc.) may configure the coding rates of the associated control channel(s) to accommodate user access under different network conditions. For instance, the vendor may appropriately configure coding rates of a control channel according to predefined ranges of signal to interference and noise ratio (SINR).

FIG. 1A illustrates a table containing examples of coding rate to SINR mapping. The mapping may be configured by the vendor of an associated network element(s) based on, amongst others, sensitivity of the network element, link budgets, available bandwidth, number of carriers, and transmit power (e.g., Pa, Pb).

Referring to FIG. 1A, the SINR may be among the range of −25 dBm to 30 dBm, although it is contemplated that any other suitable range may also be applicable. As illustrated in the example of FIG. 1A, the SINR ranges may be further classified into 11 categories, each of which may have a respective coding rate (e.g., c1 to c11) assigned thereto, although it can be understood that any other suitable arrangement may also be applicable.

Typically, SINR ranges below 0 dBm indicate poor signal quality and SINR ranges above of or equal to 0 dBm indicate good signal quality. In this regard, lower coding rates may be assigned to SINR ranges with poor signal quality (e.g., category 1 to category 5 in FIG. 1A), such that higher amount of network resources may be utilized for control channel coding when a user accesses the control channel within said SINR ranges, and vice versa.

By way of example, assuming that a user A and a user B are accessing a same control channel 1, wherein user A may access said control channel 1 from a location A within SINR range of category 5 (−5 dBm to 0 dBm) and user B may access said control channel 1 from a location B within SINR range of category 10 (20 dBm to 25 dBm). In this regard, the information transmission among control channel 1 and user A may be coded via coding rate c5 which utilizes higher amount of network resources (as compared to coding rate c10 utilized for information transmission among control channel 1 and user B).

In view of the above, a vendor of a network element(s) may configure coding rates for the associated control channel(s) to accommodate different SINR ranges, so as to enable the users to access and utilize the control channel(s) under different network conditions (e.g., different SINR ranges, etc.) to obtain the required control plane information.

Nevertheless, as discussed hereinbelow, the approach of configuring coding rates for control channel(s) in the related art is deficient for a number of reasons.

Specifically, in the related art, there is no standardized guideline or uniform requirement for configuring coding rates. Namely, different vendors may freely configure the coding rates based on their own criteria or requirement. By way of example, a vendor A may assign a coding rate c1 for control channel 1 under the SINR range of −25 dBm to −20 dBm, while another vendor B may assign another coding rate c12 for the same control channel 1 under the same SINR range. Accordingly, the users may experience inconsistent network quality when accessing control channels associated with network elements from different vendors, even if the users are accessing the control channels with consistent network conditions (e.g., similar SINR range, etc.).

Further, in the related art, although the vendors of network element(s) may preconfigure the coding rate(s) for control channel(s) of associated network element(s), the vendors may not have access to the actual performance or quality of the control channel after the associated network element(s) was deployed, and/or may not have access to the real-time network resources requirements since such information are managed by the network operator instead of the vendors. In this regard, the coding rate(s) is typically preconfigured by the vendors based on the most conservative assumption or the best assumption approaches (e.g., assumption based on generally available data, assumption based on historical feedback, assumption based on available budget, etc.), without considering the actual channel performance or channel quality and/or without considering the real-time network resource requirements. Such approaches, however, may result in imbalance between control channel robustness and resource efficiency.

To begin with, the number of users accessing a control channel under different network conditions may not be uniform and may be dynamic, and thus it is unduly challenging to maintain a balance between the control channel robustness and resource efficiency with static preconfigured coding rates (and the associated network resources assigned thereto).

For instance, FIG. 1B illustrates an example of users distribution as per SINR range obtained from a practical network system in the related art. Referring to FIG. 1B, the number of users accessing a control channel under different SINR ranges is not uniform (e.g., a majority of the users are accessing the control channel from the SINR range of 5 dBm to 10 dBm, the least users are accessing the control channel from the SINR range of 25 dBm to 30 dBm, etc.). In this regard, the network resources assigned to SINR ranges which have high number of users may be insufficient (since many users may need to queue or compete for limited network resources), while the network resources assigned to SINR ranges which have low number of users may be overly optimistic (e.g., the assigned resources are more than required).

Furthermore, the value of the coding rate (and the associated network resources) preconfigured by the vendors may not be sufficient or optimal. For instance, a coding rate of 0.20 may be assigned to users accessing the control channel with SINR range of 5 dBm to 10 dBm, while the users may need coding rate of 0.19 (which has more network resources assigned thereto) for accessing and retrieving information via the control channel, due to other factors such as number of overlapping sectors within a defined reference signal received power (RSRP) per NR or LTE window, boosted or deboosted radio signal configuration, and the like. In this case, the users may not have sufficient network resources to access the control channel or obtain information from the control channel. Conversely, a coding rate of 0.19 may be assigned to users accessing the control channel with SINR range of 5 dBm to 10 dBm, while the users may need only coding rate of 0.20 (which has less network resources assigned thereto) for accessing and retrieving information via the control channel. In this case, although the users may still be able to access and retrieve information via the control channel with the assigned coding rate, the network resources assigned are more than required and the additional resources may be wasted.

In addition, in the related art, the coding rate (and the associated network resources assignment) is static. Namely, whenever a reconfiguration of coding rate for a control channel is required, the network operator may need to request the vendor to manually update the coding rate accordingly. Such an approach is inefficient and burdensome for the network operator and the vendor, particularly when frequent reconfiguration of coding rate is required to cater the dynamic channel performance and network resources requirements. Specifically, the number of users accessing the control channel under different SINR ranges may change dynamically or frequently, causing difficulty for the network operator and/or the vendors to timely configure the coding rates assigned or mapped to each of the SINR ranges. For instance, the network operator may note that majority of the users may be accessing the control channel from the SINR range of 5 dBm to 10 dBm at a first time period, and may request the vendors to reconfigure the coding rate of said SINR range to appropriately serve the higher demand on network resources. Nevertheless, by the time the vendors receive the request and perform the coding rate reconfiguration at a second time period, the number of users accessing the control channel from the SINR range of 5 dBm to 10 dBm may be reduced and may no longer required to be reconfigured.

Example embodiments of the present disclosure provide an apparatus and method for efficiently and effectively managing one or more coding rates for one or more control channels. Specifically, apparatuses and methods of the example embodiments dynamically determine a coding rate for a control channel according to current network data (e.g., current channel quality, etc.). As a result, an optimal coding rate (as well as the associated resource allocation) can be determined based on relevant parameters, and the coding rate and the associated resource allocation may be adapted to dynamic network conditions (e.g., channel condition, radio link condition, etc.) to thereby accommodate a network system that has varying coding rate requirement.

Further, example embodiments of the present disclosure utilize a machine learning (ML) model to continuously or periodically determine an optimal coding rate for a control channel based on current network data. As a result, a suitable coding rate for the control channel with varying conditions can be easily and conveniently determined for implementation and network optimization. Accordingly, example embodiments of the present disclosure may effectively and efficiently balance the control channel robustness and network resource efficiency.

Furthermore, example embodiments of the present disclosure automatically adjust a coding rates of a control channel without requiring manual intervention from the user (e.g., vendor, network operator, etc.). As a result, the burden of the vendor and network operator in managing the coding rates of control channels may be reduced, and the changes in coding rates may be effectively reflected or deployed without human delay.

Figure 2:
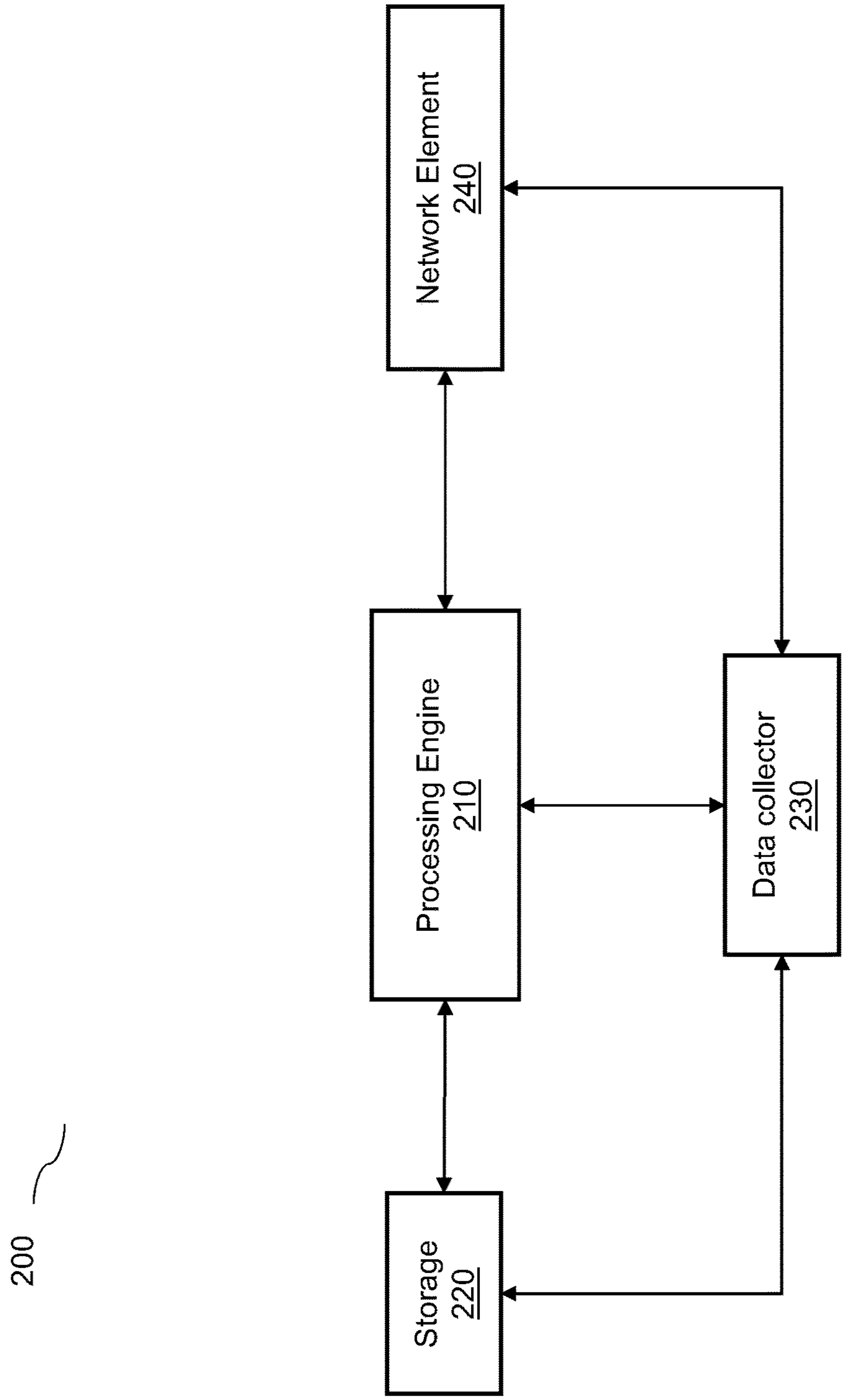
FIG. 2 illustrates a diagram of an example system for managing one or more coding rates of one or more control channels, according to one or more embodiments.

FIG. 2 illustrates a diagram of an example system 200 for managing one or more coding rates of one or more control channels, according to one or more embodiments. Referring to FIG. 2, system 200 may include a processing engine 210, a storage 220, a data collector 230, and a network element 240.

The network element 240 may constitute a network system and may provide control channel to which one or more user equipment (UE) access in order to obtain control information. It is contemplated that the network element 240 may include any suitable element(s) associated with one or more control channels such as a base transceiver station (BTS), without departing from the scope of the present disclosure.

The processing engine 210 may be communicatively coupled to the storage 220 and the data collector 230, and may be configured to obtain data from the storage 220 and the data collector 230 and to process the obtained data to determine an optimal coding rate (or optimal coding rate to SINR mapping) therefrom. For instance, the processing engine 210 may obtain the latest or current coding rate to SINR mapping from the storage 220 and to obtain the latest or current network data from the data collector 230, and may then analyze the obtained data to determine an optimal coding rate to SINR mapping. In some embodiments, the processing engine 210 may include at least one machine learning (ML) model, and the processing engine 210 may be configured to utilize the ML model to determine the optimal coding rate (or optimal coding rate to SINR mapping).

To this end, the processing engine 210 may be configured to train the ML model to output a recommended or optimal coding rate to SINR mapping based on inputted coding rate to SINR mapping and network data. According to an example embodiment, the ML model may include at least one supervised ML model which may be configured to receive predetermined data or parameters (e.g., preconfigured coding rate to SINR mapping, predetermined channel quality or performance associated with each coding rate, predetermined cording rate to SINR mapping, etc.), to analyze the received data or parameters to determine the optimality of the control channel, and to determine a recommended coding rate to optimize the control channel performance or quality based on the determined optimality and the predetermined parameters. The supervised ML model may include: linear regression model, logistic regression model, support vector machine (SVM) model, neural network model, or any suitable supervised ML model.

The processing engine 210 may be configured to determine the optimal coding rate (or optimal coding ate to SINR mapping) continuously or periodically based on a trigger event, e.g., one or more of the network data crossing (above or below) a predetermined threshold value, a network value, a KPI value crossing a predetermined threshold value, and the like.

Further, the processing engine 210 may be configured to receive the data or information from the storage 220 and/or the data collector 230 via a push or a pull method. That is, the data or information may be pushed to or pulled (or requested) by the processing engine 210 periodically, continuously, or in response to a particular event (e.g., user request, triggering event such as a network failure, etc.). Alternatively, the processing engine 210 may be configured to receive the data and information from the storage 220 and/or the data collector 230 continuously in real-time or near real-time.

Referring back to FIG. 2, the storage 220 may be configured to store predetermined data or parameters such as preconfigured coding rate to SINR mapping, predetermined channel quality or performance associated with each coding rate, predetermined configuration parameters (e.g., control channel types (e.g., RACH, PUCCH, PDCCH, etc.), radio/cell level parameters, transmit power, reference signal powers, etc.), grid parameters (e.g., coverage, quality and associated cell ID), carrier parameters (e.g., carrier number, bandwidth associated with the operating carrier, etc.), and the like.

Further, the storage 220 may be configured to store network data (obtained via the data collector 230 directly and/or indirectly from the network element 240), such as channel quality metrics (e.g., percentage of negative acknowledgement (NACK) per RNTI type, percentage of cyclic redundancy check (CRC) per RNTI type, etc.), and any suitable data or parameter which may define the performance or quality of the control channel under the current coding rate. Furthermore, the storage 220 may be configured to store the optimal coding rate to SINR mapping determined by the processing engine 210, such that said optimal coding rate to SINR mapping may be provided to the processing engine 210 for further processing when required. Further, it is understood that the network data can include any key performance indicator (KPI) data of the network and/or the control channel.

The data collector 230 may be configured to collect various network data (e.g., network parameter or performance data) from the network element 240 and to store the same in the storage 220. For example, the data collector 230 may be configured to continuously collect the network data, periodically collect the network data (e.g., once per day, once per hour, etc.), and/or collect the network data in response to an event (e.g., a user input, a triggering event, etc.). Further, the data collector 230 may be configured to provide the network data to the processing engine 210 (e.g., in real-time or near real-time, in response to an event, etc.).

In some embodiments, the data collector 230 may comprise an observability framework which may be configured to provide continuous (or periodical) network observability. For instance, the observability framework may be configured to collect logs, metrics, and/or traces associated with the network element 240 (and the control channel(s) associated therewith), and thereby provides comprehensive insights (e.g., status, activity, quality, performance, etc.) thereof.

Figure 3:
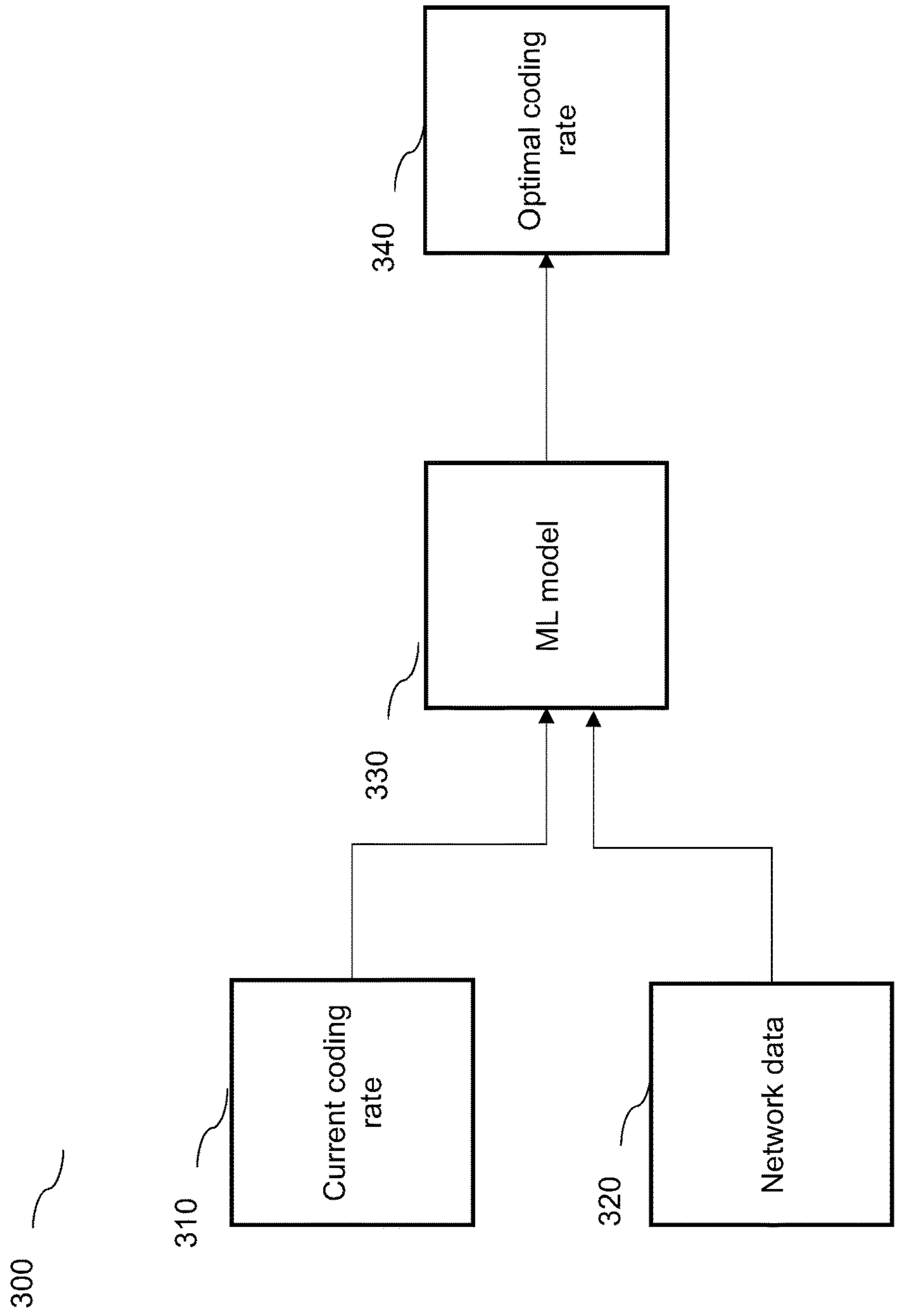
FIG. 3 is a block diagram of an example operation of determination of an optimal coding rate, according to one or more embodiments.

FIG. 3 is a block diagram of an example operation 300 of determination of an optimal coding rate, according to one or more embodiments. Operation 300 may be performed by the processing engine 210 in FIG. 2 to determine an optimal coding rate for a control channel(s) of the network element 240, based on the data or parameters obtained from the storage 220 and the data collector 230.

Referring to FIG. 3, at least two data or parameters 310 and 320 are inputted to a ML model 330 and an output 340 are provided by the ML model 330. Specifically, data 310 relating to a current coding rate and network data 320 relating to a current control channel quality are provided to the ML model 330, and the ML model 330 may determine and output an optimal coding rate 340 by analyzing data 310 and network data 320.

The data 310 may include a current coding rate to SINR mapping, which may be a coding rate to SINR mapping preconfigured by a user (e.g., a vendor, etc.) or a coding rate to SINR mapping determined by the processing engine 220 in a previous cycle and currently applied to the network element 240. The network data 320 may include a channel quality metric such as NACK percentage, CRC percentage, and the like, as described above with reference to FIG. 2. The optimal coding rate 340 may include an optimal coding rate to SINR mapping. The optimal coding rate (or optimal coding rate to SINR mapping) may be an adjusted version or a configured version of the current coding rate (or current coding rate to SINR mapping) 310, or may be the same with the current coding rate (or current coding rate to SINR mapping) 310 when it is determined that no adjustment or configuration on the current coding rate (or current coding rate to SINR mapping) 310 is required.

Figure 4:
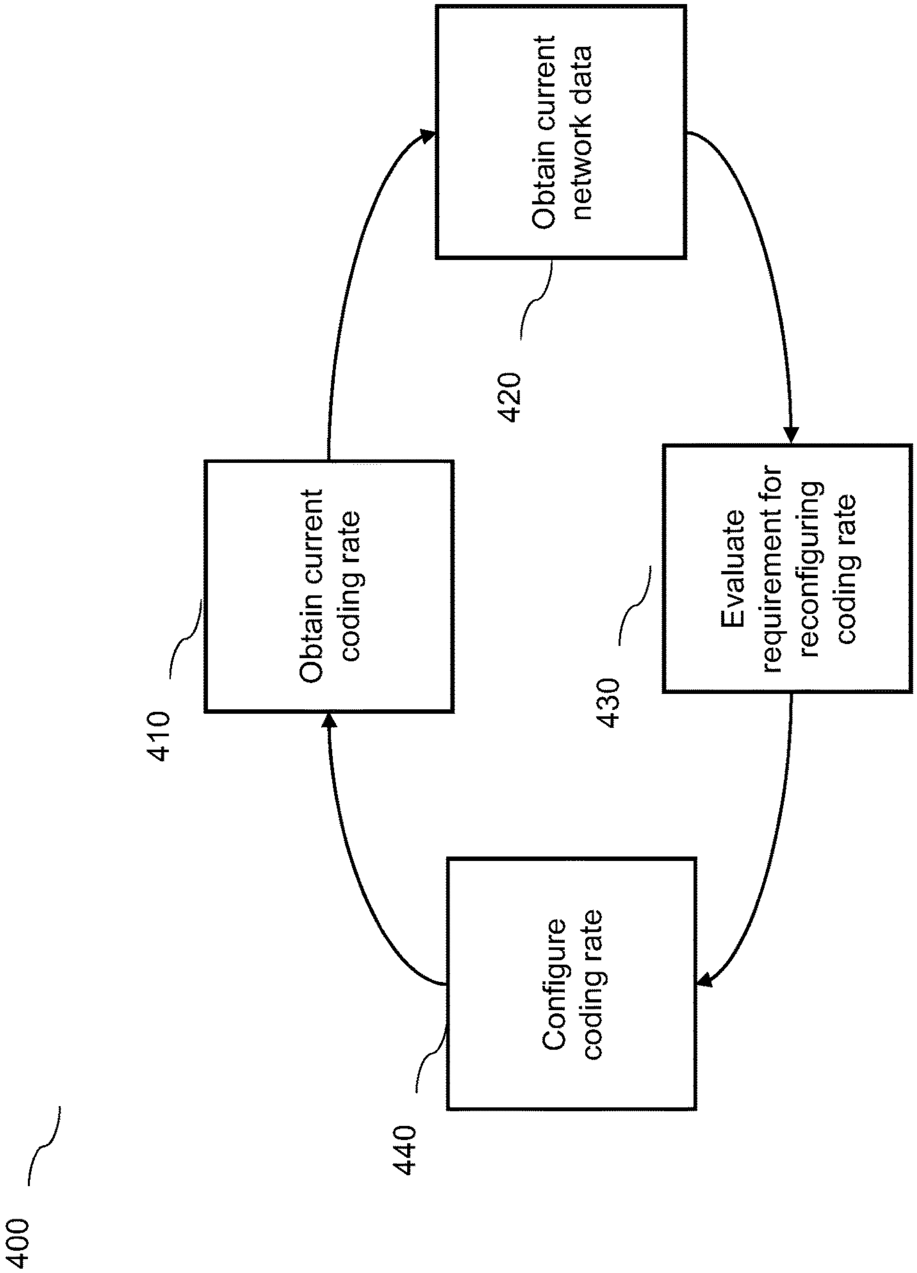
FIG. 4 is a flow diagram of an example supervised machine learning (ML) model, according to one or more embodiments.

FIG. 4 is a flow diagram of an example supervised machine learning (ML) model 400, according to one or more embodiments. In general, supervised learning is a type of machine learning that builds an optimal model by using predetermined data or parameters. As the predetermined parameters are inputted or fed to the model, the weight of the model is adjusted until the objective model has been fitted appropriately, which occurs as part of the cross validation process. As can be seen in FIG. 4, the supervised ML model implements a feedback loop which feeds or inputs the current coding rate to SINR mapping (e.g., previously determined optimal coding rate to SINR mapping, currently deployed coding rate to SINR mapping, etc.) and the determined network data or parameters, so as to continuously train and optimize the supervised ML model. The supervised ML model 400 may be utilized by the processing engine 210 in determining optimal coding rate (e.g., via operation 300 in FIG. 3, etc.).

Referring to FIG. 4, at operation S410, the data of the current coding rate (e.g., current coding rate to SINR mapping) is obtained, and at operation S420, the current network data is obtained. Both operations S410 and S420 may be performed by the processing engine 210 in a similar manner as described above with reference to FIG. 3, thus redundant descriptions associated therewith may be omitted below for conciseness. The obtained data or information may be fed or inputted by the processing engine 210 to the supervised ML model.

At operation S430, the supervised ML model may analyze the fed or inputted data or information to evaluate whether or not it is required to reconfigure the current coding rate (e.g., whether or not it is required to reconfigure the current coding rate to SINR mapping, etc.). For instance, the supervised ML model may evaluate, based on the current network data, whether or not the current control channel quality (e.g., control channel quality achieved by utilizing the current coding rate to SINR mapping, etc.) is within an allowable condition, and may then determine whether or not the current coding rate is still optimal and whether or not it is required to reconfigure the current coding rate.

At operation S440, the supervised ML model may configure the coding rate according to the evaluation at operation S430. For instance, the supervised ML model may adjust a coding rate mapped to a SINR range to another coding rate. Accordingly, the adjusted or configured coding rate to SINR mapping may be fed or inputted as the "current coding rate to SINR mapping" at operation S410 of the next cycle.

Figure 5A:
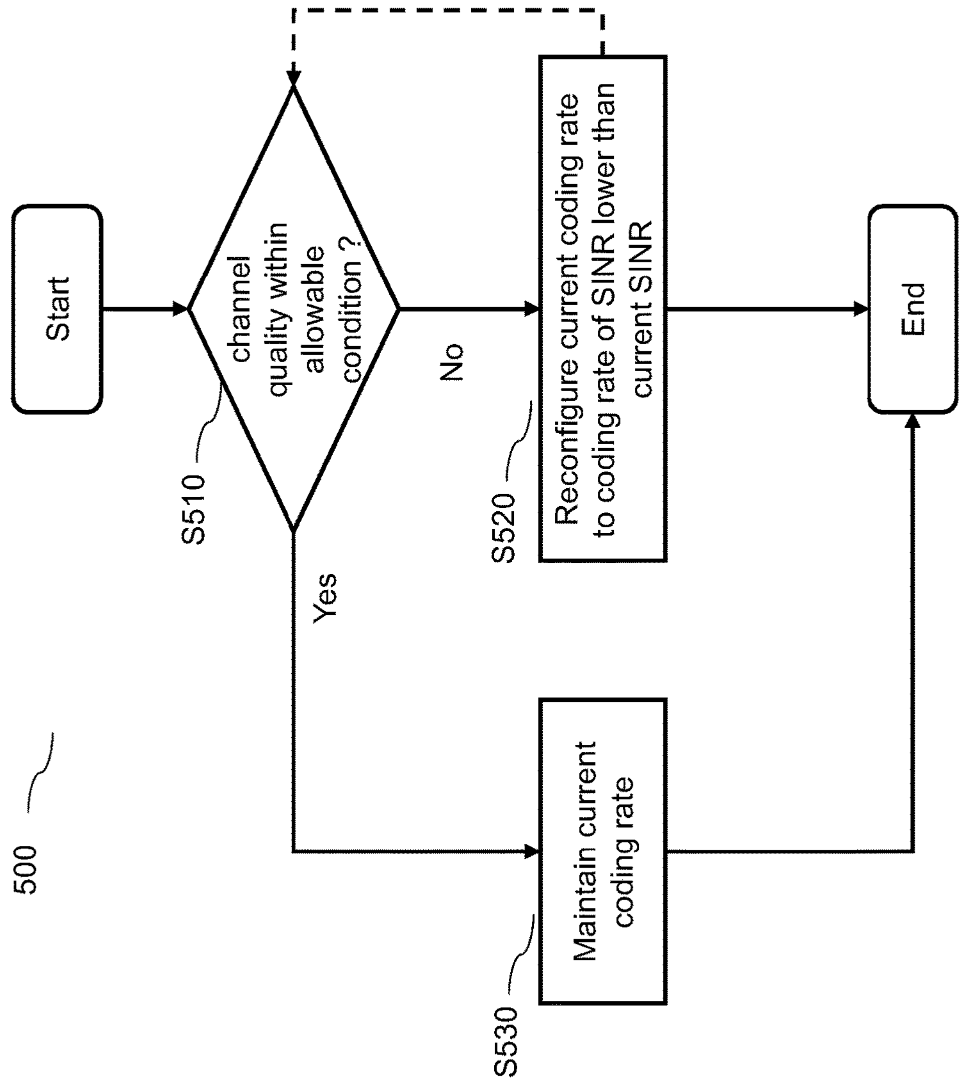
FIG. 5A illustrates a block diagram of an example method for managing a coding rate, according to one or more embodiments.

FIG. 5A illustrates a block diagram of an example method 500 for managing a coding rate, according to one or more embodiments. Method 500 may be part of operations S430 and S440 in FIG. 4, and one or more operations of Method 500 may be performed by the supervised ML model described above with reference to FIG. 4.

Referring to FIG. 5A, at operation S510, it is determined whether or not a channel quality is within an allowable condition. Specifically, a current channel quality is compared to a threshold (e.g., predetermined threshold) defining the allowable condition. For example, a percentage of NACK may be compared to a threshold of maximum allowable NACK. Accordingly, based on determining that the percentage of NACK is greater than or equal to the threshold of maximum allowable NACK, it may be determined that the channel quality is not within the allowable condition, and the process may proceed to operation S520. Conversely, based on determining that the percentage of NACK is lower than the threshold of maximum allowable NACK, it may be determined that the channel quality is within the allowable condition, and the process may proceed to operation S530. It can be understood that other data parameters, such as: percentage of CRC failure, percentage of acknowledgement (ACK), and the like, may also be utilized at operation S510 to determine the condition of the current channel quality, without departing from the scope of the present disclosure.

At operation S530, the current coding rate (i.e., coding rate in the current coding rate to SINR mapping) is determined as the optimal coding rate since said coding rate may provide channel quality within the allowable condition. Thus, the current coding rate may be maintained.

At operation S520, the current coding rate (i.e., coding rate in the current coding rate to SINR mapping) is reconfigured. For instance, the current coding rate is reconfigured to coding rate of SINR range lower than current SINR range. Referring to FIG. 5B, which illustrates an example embodiment in which the coding rate to SINR mapping is reconfigured in a similar manner as described with reference to operation S520.

As shown in FIG. 5B, table 511 illustrates a table including example coding rate to SINR mappings, and table 512 illustrates a table including example adjusted or reconfigured coding rate to SINR mappings. Specifically, in this example embodiment, the supervised ML model determines that the channel quality is not within the allowable condition when coding rate c5 is utilized for coding control channel when a user(s) is accessing the control channel with SINR range of −5 dBm to 0 dBm. Thus, the supervised ML model may reconfigure the coding rate of SINR range of −5 dBm to 0 dBm from c5 to c4 (i.e., coding rate of the lower SINR range), such that lower coding rate (i.e., c4) with higher amount of resources may be assigned to the SINR range of −5 dBm to 0 dBm. In this regard, the coding rate for the SINR range of −10 dBm to −5 dBm may be maintained as c4, or may be reconfigured to another appropriate coding rate (e.g., coding rate of the SINR range lower than −10 dBm to −5 dBm, etc.).

Referring back to FIG. 5A and FIG. 4, upon reconfiguring the coding rate, the process of method 500 (which may correspond to operation S440 in FIG. 4) may end. Subsequently, the supervised ML model may iteratively repeat operations S410-S440 in FIG. 4 to fine tune the coding rate until the optimal coding rate is determined. Alternatively, instead of ending the process of method 500, the process may return to operation S510 such that the performance or channel quality of the reconfigured coding rate may be determined and the coding rate to SINR mapping may be further reconfigured (if required) until the channel quality is within the allowable condition.

Figure 6A:
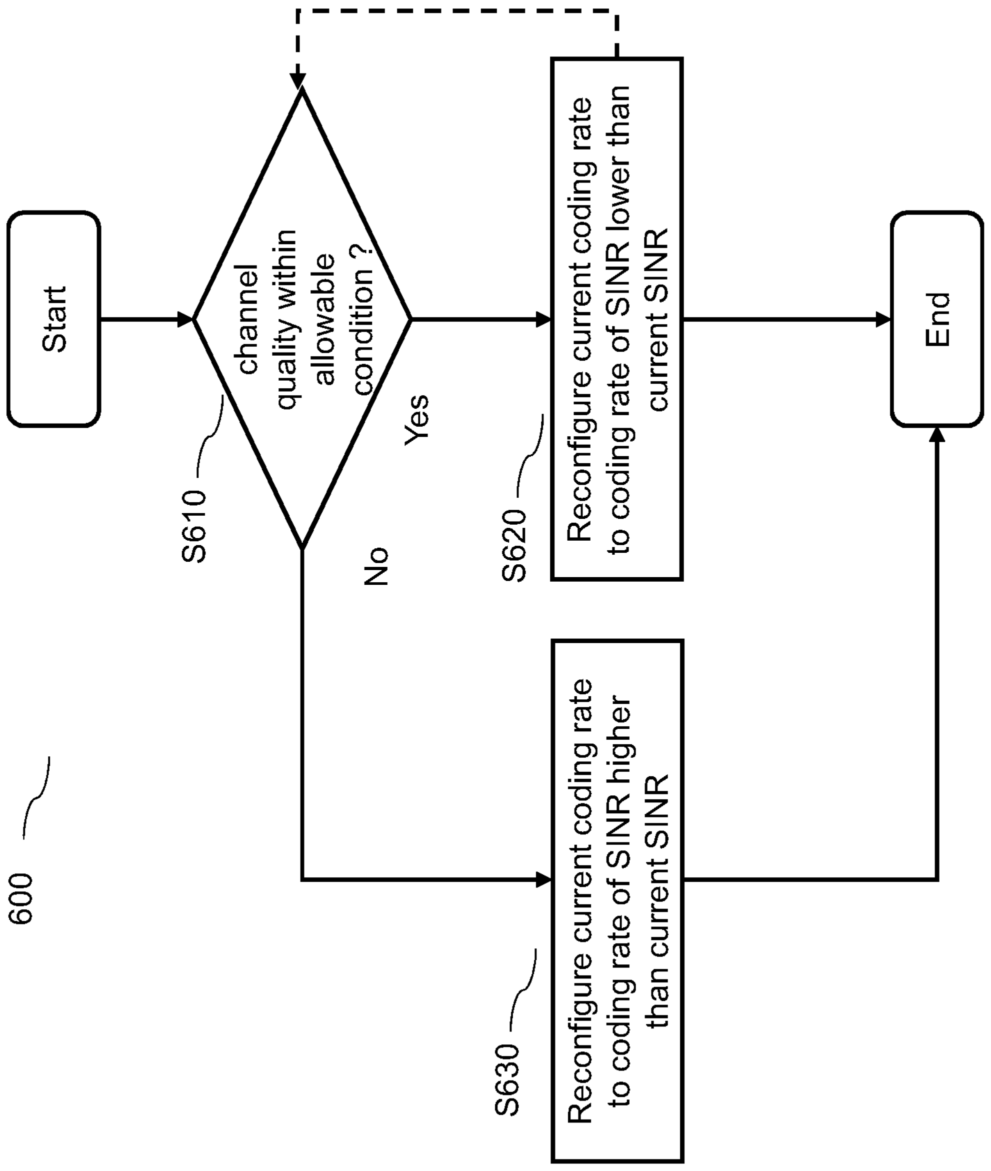
FIG. 6A illustrates a block diagram of another example method for managing a coding rate, according to one or more embodiments.

FIG. 6A illustrates a block diagram of another example method 600 for managing a coding rate, according to one or more embodiments. Method 600 may be part of operations S430 and S440 in FIG. 4, and one or more operations of Method 600 may be performed by the supervised ML model described above with reference to FIG. 4. Operations S610 and S620 in method 600 may be similar to operations S510 and S520 in FIG. 5A, thus redundant descriptions associated therewith may be omitted in below for conciseness.

Referring to FIG. 6A, at operation S630, based on determining that the channel quality is within an allowable condition (e.g., the percentage of NACK lower than the threshold of maximum allowable NACK, etc.), instead of maintaining the current coding rate as in operation S530 of FIG. 5A, the current coding rate is reconfigured to coding rate of SINR range higher than current SINR range.

Referring to FIG. 6B, which illustrates an example embodiment in which the coding rate to SINR mapping is reconfigured in a similar manner as described with reference to operation S620.

As illustrated in FIG. 6B, table 611 illustrates a table including example coding rate to SINR mappings, and table 612 illustrates a table including example adjusted or reconfigured coding rate to SINR mappings. Specifically, in this example embodiment, the supervised ML model determines that the channel quality is within an allowable condition when coding rate c4 is utilized for coding control channel when a user(s) is accessing the control channel with SINR range of −10 dBm to −5 dBm. Thus, the supervised ML model may reconfigure the coding rate of the SINR range of −10 dBm to −5 dBm from c4 to c5 (i.e., coding rate of the higher SINR range), such that higher coding rate (i.e., c5) with lower amount of resources may be assigned to the SINR range of −10 dBm to −5 dBm. In this regard, the coding rate for the SINR range of −5 dBm to −0 dBm may be maintained as c5, or may be reconfigured to another appropriate coding rate.

In addition, it can be understood that one or more operations described hereinabove may be performed as per RNTI type of a control channel(s), without departing from the scope of the present disclosure.

For instance, FIG. 7 illustrates radio network temporary identifiers (RNTI) information of a control channel, according to one or more embodiments. Specifically, FIG. 7 illustrates a table 711 containing multiple RNTIs of a control channel, and a table 712 containing coding rate and network resources assigned to each of the RNTIs.

As illustrated in FIG. 7, a control channel may include multiple RNTIs, such as but are not limited to: cell RNTI (C-RNTI), paging RNTI (P-RNTI), random access RNTI (RA-RNTI), system information RNTI (SI-RNTI), and temporary cell RNTI (Temp C-RNTI).

Each of the RNTIs may have a coding rate (and a corresponding network resource) assigned thereto, and thus the quality and performance of a control channel may varies as per RNTIs. For instance, control channel 1 may have A % of CRC fail rate under C-RNTI, and may have B % of CRC fail rate under P-RNTI, wherein A % may be different from B %.

In view of the above, the operations described above with reference to FIG. 3 to FIG. 6B may be performed as per RNTI type. For instance, the supervised ML model may obtain coding rate to SINR mapping for each RNTI type of a control channel, to evaluate whether or not the channel quality under each RNTI type is within a respective allowable condition, and to reconfigure the coding rate mapped to each RNTI type so as to determine an optimal coding rate to each RNTI type.

In addition, it is also contemplated that one or more operations described hereinabove may be performed as per control channel type, without departing from the scope of the present disclosure.

For instance, FIG. 8 illustrates multiple control channels and the associated information, according to one or more embodiments. Specifically, FIG. 8 illustrates a table 811 containing channel quality metric for multiple control channels, and a table 812 containing coding rate and network resources assigned to each of the control channels.

As illustrated in FIG. 8, the control channels may include, but are not limited to: random access control channel (RACH), physical uplink control channel (PUCCH), physical downlink control channel (PDCCH), physical uplink shared channel (PUSCH), and broadcast control channel (BCCH). Each of the control channels may have a coding rate (and a corresponding network resource) assigned thereto, and thus the quality and performance of each control channel may varies. For instance, RACH may have A % of CRC fail rate, and PUCCH may have B % of CRC fail rate, wherein A % may be different from B %.

In view of the above, the operations described above with reference to FIG. 3 to FIG. 6B may be performed as per control channel type. For instance, the supervised ML model may obtain coding rate to SINR mapping for each control channels, to evaluate whether or not the channel quality under each control channel is within a respective allowable condition, and to reconfigure the coding rate mapped to each control channel so as to determine an optimal coding rate to each control channel.

It is also contemplated that the one or more operations described hereinabove may be performed as per control channel type and as per RNTI type, without departing from the scope of the present disclosure.

Referring back to FIG. 2, upon determining the optimal coding rate (or optimal coding rate to SINR mapping), the processing engine 210 may provide the associated information to the network element 240, such that network element 240 may utilize the optimal coding rate. In some embodiments, the processing engine 210 may be configured to also provide the information associated with the optimal coding rate (or optimal coding rate to SINR mapping) to one or more other network elements within the same network system. For instance, said information may be announced or propagated across the network system so that one or more other network elements within the network system may utilize the information. According to an example embodiment in which the network element is a base station (e.g., eNodeB, gNodeB, etc.), the information associated with the optimal coding rate (or optimal coding rate to SINR mapping) may be shared by the base station to another base station (e.g., via X2 interface, via Xn interface, etc.), and the like, such that said information may be utilized by said another base station whenever the associated user (or user equipment) is moved from one cell to the another.

Figure 9:
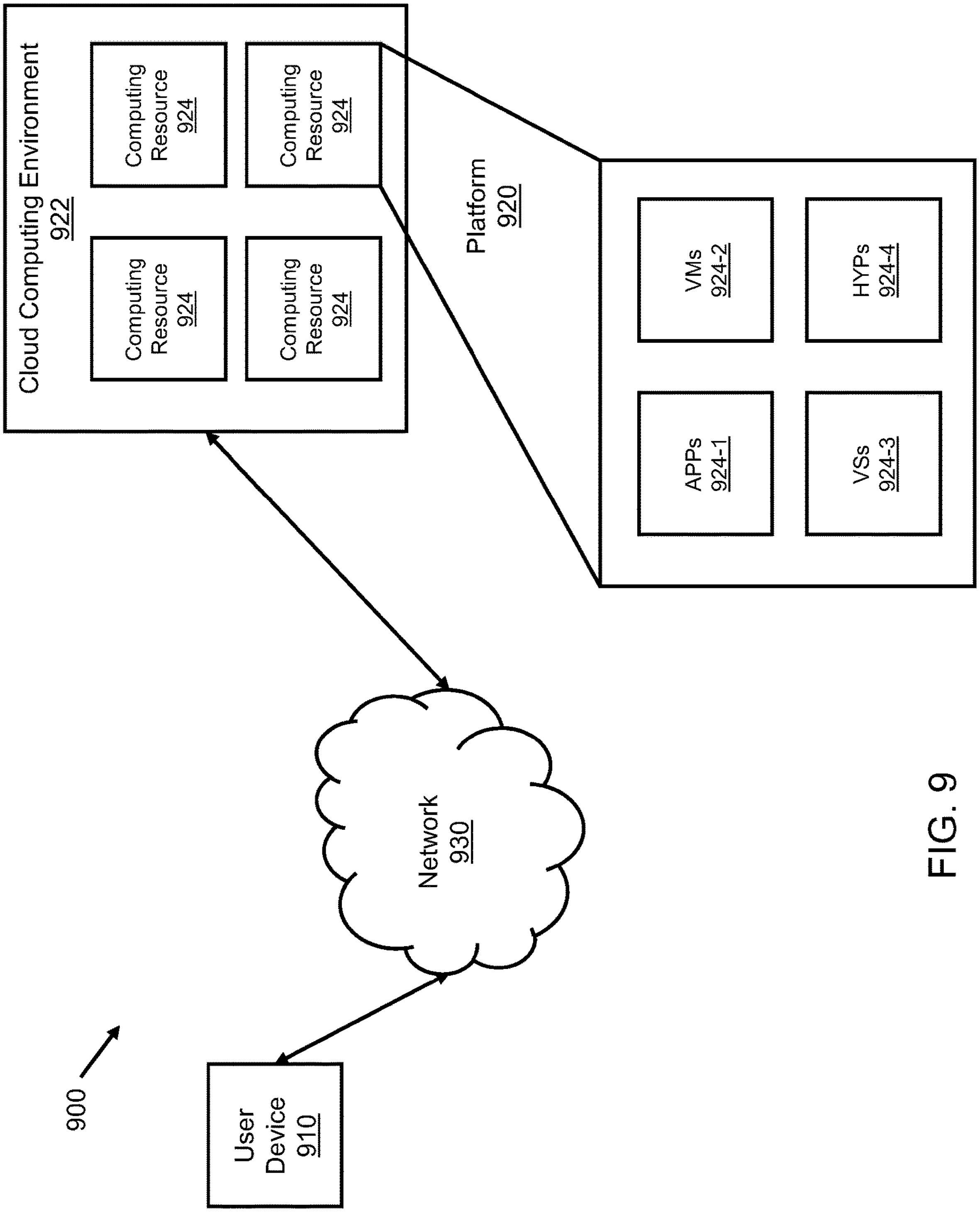
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIG. 2 through FIG. 8 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
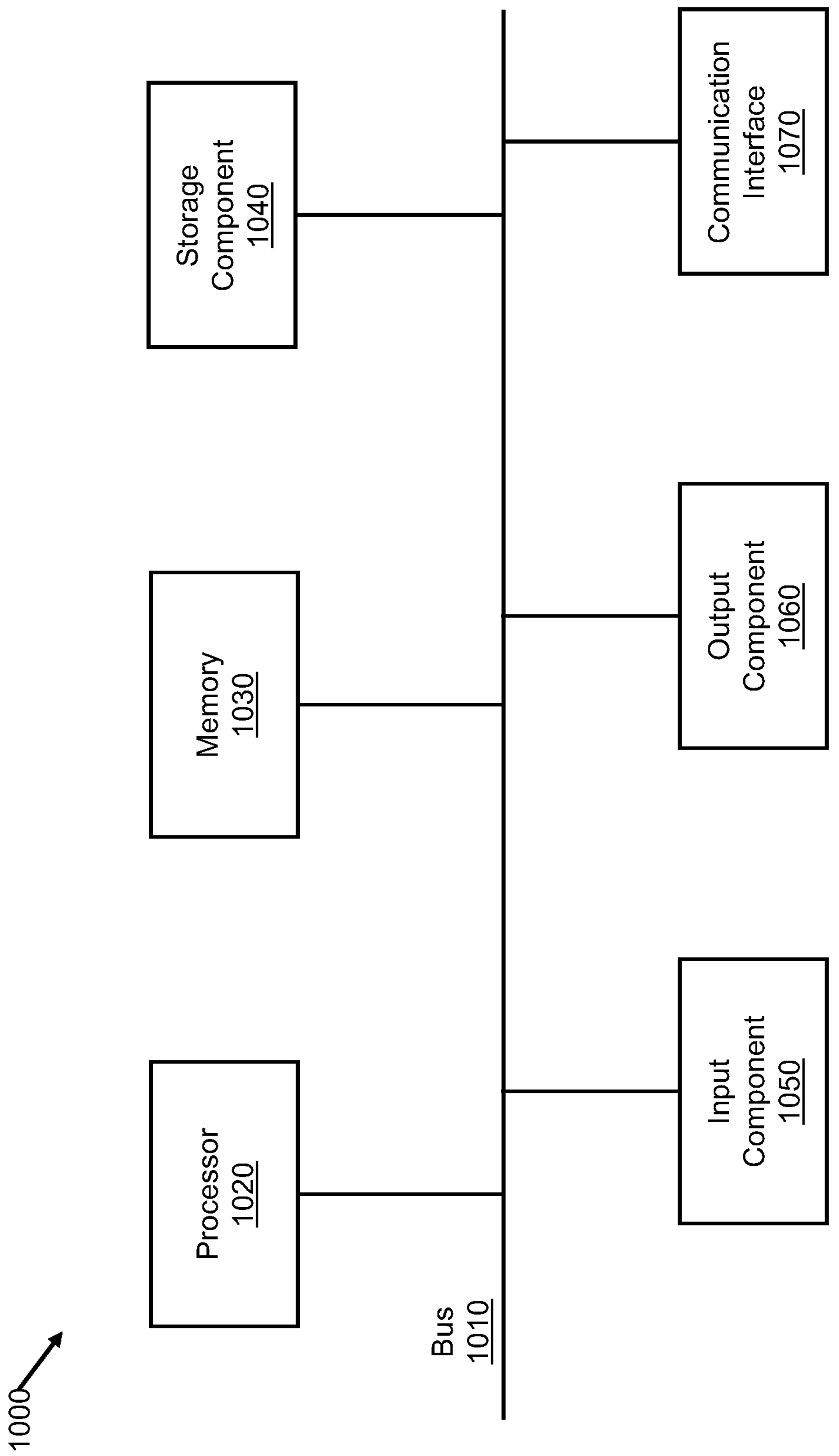
FIG. 10 is a diagram of example components of a device, according to one or more embodiments.

FIG. 10 is a diagram of example components of a device 1000. Device 1000 may correspond to user device 910 and/or platform 920 in FIG. 9. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

According to embodiments, any one of the operations or processes described with reference to FIG. 2 through FIG. 8 may be implemented by or using any one or more of the elements illustrated in FIG. 9 and FIG. 10.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus comprising:

a memory storage storing computer-executable instructions; and at least one processor communicatively coupled to the memory storage, wherein the at least one processor is configured to execute the instructions to:

obtain data relating to a current coding rate of a control channel and network data relating to a current control channel quality;

analyze, by a machine learning (ML) model, the obtained data and the obtained network data to determine an optimal coding rate for the control channel; and output the determined optimal coding rate, wherein the data relating to the current coding rate of the control channel comprises a first mapping of the current coding rate to a current predetermined signal to interference and noise ratio (SINR) range, and wherein the at least one processor is configured to execute the instructions to analyze the obtained data and the obtained network data to determine the optimal coding rate by:

determining, based on the obtained network data, whether or not the current control channel quality is within an allowable condition; and based on determining that the current control channel quality is not within the allowable condition, reconfiguring the first mapping of the current coding rate to the current predetermined SINR range to a second mapping of the current coding rate to a second predetermined SINR range that is lower than the current predetermined SINR range.

2. The apparatus as claimed in claim 1, wherein the at least one processor is configured to execute the instructions to analyze the obtained data and the obtained network data to determine the optimal coding rate by using a supervised ML model.

3. The apparatus as claimed in claim 1, wherein the allowable condition comprises a percentage of NACK being less than a threshold of maximum allowable NACK.

4. The apparatus as claimed in claim 1, wherein the network data comprises a percentage of negative acknowledgement (NACK).

5. The apparatus as claimed in claim 1, wherein the at least one processor is configured to execute the instructions to analyze the obtained data and the obtained network data to determine the optimal coding rate by:

determining the current coding rate as the optimal coding rate.

6. The apparatus as claimed in claim 1, wherein the at least one processor is configured to execute the instructions to analyze the obtained data and the obtained network data to determine the optimal coding rate by:

based on determining that the current control channel quality is within the allowable condition, reconfiguring the first mapping of the current coding rate to a third mapping of the current coding rate to a third predetermined SINR range higher than the current predetermined SINR range; and determining the current coding rate as the optimal coding rate.

7. The apparatus as claimed in claim 1, wherein the at least one processor is configured to execute the instructions to repeatedly perform the obtaining, the analyzing, and the outputting.

8. A method, performed by at least one processor, comprising:

obtaining data relating to a current coding rate of a control channel and network data relating to a current control channel quality;

analyzing, by a machine learning (ML) model, the obtained data and the obtained network data to determine an optimal coding rate for the control channel; and outputting the determined optimal coding rate, wherein the data relating to the current coding rate of the control channel comprises a first mapping of the current coding rate to a current predetermined signal to interference and noise ratio (SINR) range, and wherein the analyzing of the obtained data and the obtained network data to determine the optimal coding rate comprises:

determining, based on the obtained network data, whether or not the current control channel quality is within an allowable condition; and based on determining that the current control channel quality is not within the allowable condition, reconfiguring the first mapping of the current coding rate to the current predetermined SINR range to a second mapping of the current coding rate to a second predetermined SINR range that is lower than the current SINR range.

9. The method as claimed in claim 8, wherein the analyzing of the obtained data and the obtained network data to determine the optimal coding rate comprises using a supervised ML model to analyze the obtained data and the obtained network data.

10. The method as claimed in claim 8, wherein the allowable condition comprises a percentage of NACK being less than a threshold of maximum allowable NACK.

11. The method as claimed in claim 8, wherein the network data comprises a percentage of negative acknowledgement (NACK).

12. The method as claimed in claim 8, wherein the analyzing of the obtained data and the obtained network data to determine the optimal coding rate comprises:

determining the current coding rate as the optimal coding rate.

13. The method as claimed in claim 8, wherein the analyzing of the obtained data and the obtained network data to determine the optimal coding rate comprising:

based on determining that the current control channel quality is within the allowable condition, reconfiguring the first mapping of the current coding rate to a third mapping of the current coding rate to a third predetermined SINR range higher than the current predetermined SINR range; and determining the current coding rate as the optimal coding rate.

14. The method as claimed in claim 8, further comprising repeating the obtaining, the analyzing, and the outputting.

15. A non-transitory computer-readable recording medium having recorded thereon instructions executable by at least one processor to cause the at least one processor to perform a method comprising:

obtaining data relating to a current coding rate of a control channel and network data relating to a current control channel quality;

analyzing, by a machine learning (ML) model, the obtained data and the obtained network data to determine an optimal coding rate for the control channel; and outputting the determined optimal coding rate, wherein the data relating to the current coding rate of the control channel comprises a first mapping of the current coding rate to a current predetermined signal to interference and noise ratio (SINR) range, and wherein the analyzing of the obtained data and the obtained network data to determine the optimal coding rate comprises:

determining, based on the obtained network data, whether or not the current control channel quality is within an allowable condition; and based on determining that the current control channel quality is not within the allowable condition, reconfiguring the first mapping of the current coding rate to the current predetermined SINR range to a second mapping of the current coding rate to a second predetermined SINR range that is lower than the current predetermined SINR range.

16. The non-transitory computer-readable recording medium as claimed in claim 15, wherein the analyzing of the obtained data and the obtained network data to determine the optimal coding rate comprises using a supervised ML model to analyze the obtained data and the obtained network data.

17. The non-transitory computer-readable recording medium as claimed in claim 15, wherein the allowable condition comprises a percentage of NACK being less than a threshold of maximum allowable NACK.

18. The non-transitory computer-readable recording medium as claimed in claim 15, wherein the network data comprises a percentage of negative acknowledgement (NACK).

19. The non-transitory computer-readable recording medium as claimed in claim 15, wherein the analyzing of the obtained data and the obtained network data to determine the optimal coding rate comprises:

determining the current coding rate as the optimal coding rate.

20. The non-transitory computer-readable recording medium as claimed in claim 15, wherein the analyzing of the obtained data and the obtained network data to determine the optimal coding rate comprising:

based on determining that the current control channel quality is within the allowable condition, reconfiguring the first mapping of the current coding rate to a third mapping of the current coding rate to a third predetermined SINR range higher than the current predetermined SINR range; and determining the current coding rate as the optimal coding rate.

* * * * *